UNITED STATES PATENT OFFICE.

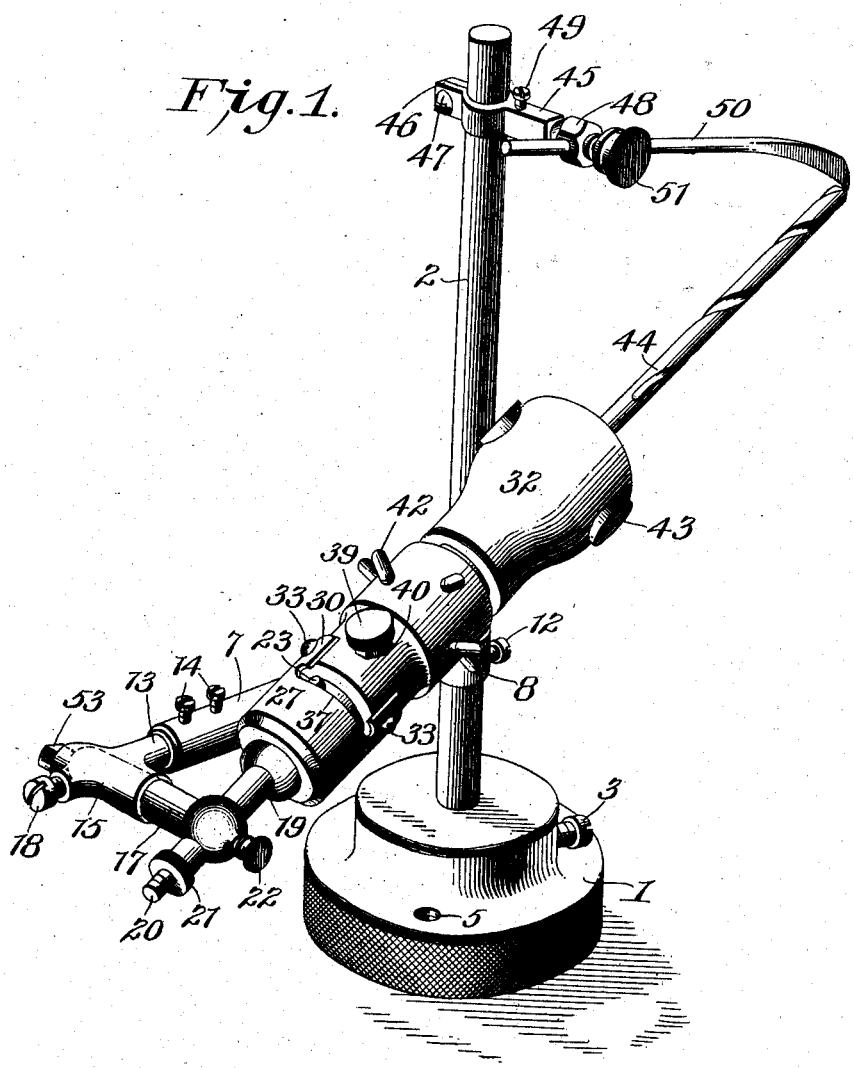

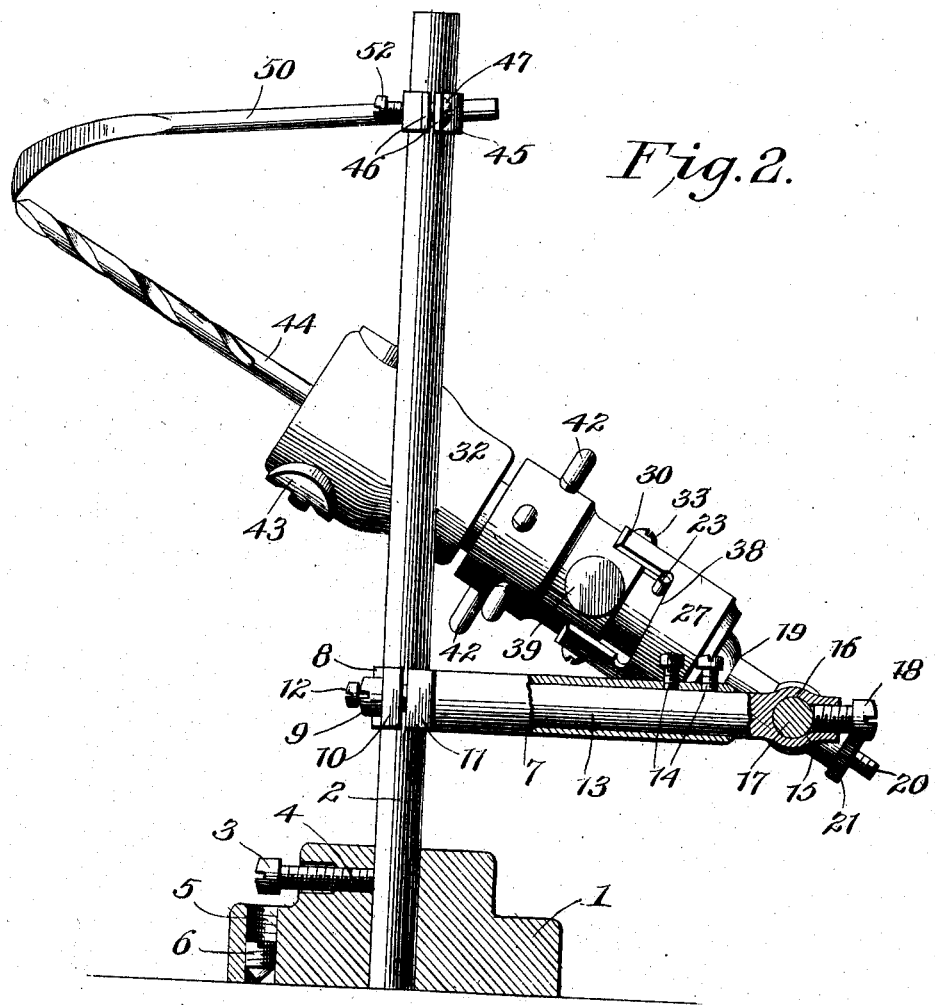

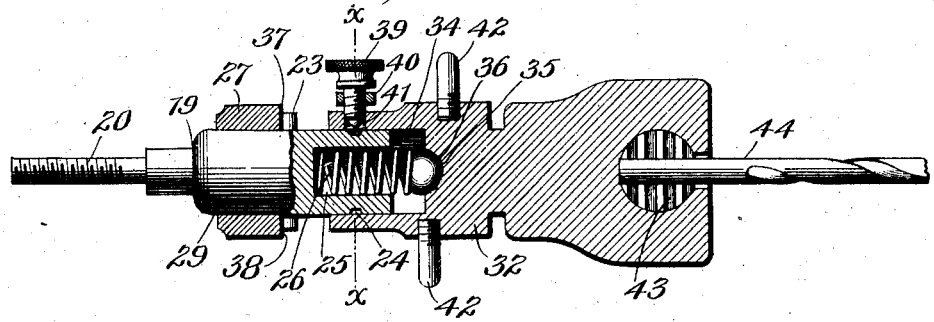
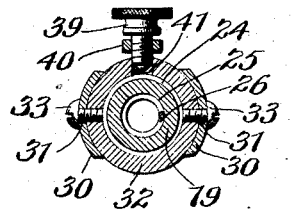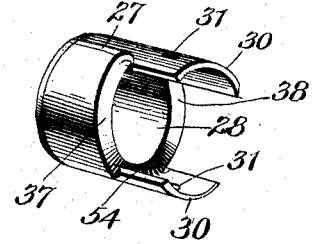
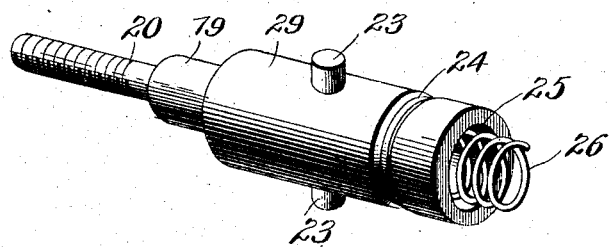

OTTO LANGE, OF CAMDEN, NEW JERSEY.

DRILL-GRINDER.

No. 864,546.　　　Specification of Letters Patent.　　　Patented Aug. 27, 1907.

Application filed March 14, 1907. Serial No. 362,274.

*To all whom it may concern:*

Be it known that I, OTTO LANGE, a citizen of the United States, residing in the city and county of Camden, State of New Jersey, have invented a new and useful Drill-Grinder, of which the following is a specification.

The object of my present invention is to devise a novel construction of a portable drill grinder by the employment of which drills of comparatively small size may be accurately and quickly ground.

To the above ends my invention consists broadly of the combination with a chuck for holding the drill of means for causing said chuck when rotated to be gradually advanced during a predetermined period in order that the two cutting edges of the drill may have the same contour and that each cutting face will be backed off in the same manner which, as is well known in the art, is essential for the accurate cutting of the drill.

My invention further consists of a novel construction of adjustable support by the employment of which the drill carried by the drill chuck may be brought to any desired angle with respect to the grind-stone, emery wheel or other sharpening device.

It further consists of a novel construction of rotatable member which is detachably secured to the chuck and which coacts with the chuck support for effecting the longitudinal movement of the drill when the chuck is being rotated.

It further consists of novel means for rendering the advancing mechansim for the chuck inoperative when it is desired to bevel the end of an article such as a center-punch.

It further consists of a novel construction of a drill support in which the means carried by the stationary support are yieldingly maintained in engagement with the means carried by the chuck and coacting therewith for causing the longitudinal movement of the drill chuck during the rotation of the latter.

It further consists of other novel features of construction, all as will be hereinafter fully set forth.

For the purpose of illustrating my invention, I have shown in the accompanying drawings one form of a device, since this embodiment best illustrates the principle thereof and gives satisfactory and reliable results in practice, although it is to be understood that the various instrumentalities of which my invention consists can be variously arranged and organized and that my invention is not limited to the precise arrangement and organization of these instrumentalities, as herein shown.

Figure 1 represents a perspective view of a support for grinding drills, embodying my invention. Fig. 2 represents a perspective view of my device, certain of the parts being shown in section. Fig. 3 represents a sectional plan view of a portion of the drill chuck and certain of its adjuncts, in detached position. Fig. 4 represents a section on line x—x Fig. 3. Fig. 5 represents a perspective view of a portion of Fig. 1 in detached position. Fig. 6 represents, on an enlarged scale, a perspective view showing more clearly the stationary support with which the drill chuck coacts and certain of their adjuncts.

Similar numerals of reference indicate corresponding parts in the figures.

Referring to the drawings, 1 designates the base within which is adjustably mounted a standard or upright 2 by means of a set screw 3 having threaded engagement at 4 with the base 1 and adapted to engage said standard 2.

5 designates threaded apertures in the base 1 with which coact set screws 6, the beveled ends of which are adapted to engage a recess in the plate carried by the grinding machine and since the same is well known in the art, I have deemed it unnecessary to illustrate or describe the same, it being apparent that by means of these set screws 6 any improper movement of the base 1 is positively prevented during the grinding operation.

7 designates a sleeve or casing having an enlargement 8 at one end thereof through which the standard 2 passes, the disengagement of the casing from said standard being prevented by means of a set screw 9 having threaded engagement with the flanges 10 and 11 of said enlargement 8. The sleeve or casing 7 is prevented from rotating and maintained in the adjusted position given thereto by means of a set screw 12 passing through the enlargement 8 and engaging the standard 2.

13 designates a rod mounted in the sleeve or casing 7. The longitudinal adjustment of the rod 13 as well as the rotation of said rod is provided by means of set screws 14. The end of the rod 13 is provided with an enlargement 15 having an aperture 16 therethrough in which is mounted a rod or bar 17, said rod or bar being rotatably adjusted by means of the set screw 18 having threaded engagement with the enlargement 15 and having its end adapted to contact with the rod or bar 17, as is clearly apparent from Figs. 1 and 2.

19 designates a chuck support having extending therefrom a stem 20 which has a bearing in the rod or bar 17 or in an enlargement thereof, said stem being maintained in proper relation with respect to said bar by means of a nut 21 engaging the threaded extension of said stem. The rotation of the stem 20 is prevented by means of a set screw 22. The chuck support 19 has extending therefrom, in the present instance, on opposite sides thereof, lugs or pins 23 and is also provided with an annular groove 24. The end of the support 19 is chambered or recessed, as indicated at 25, and in this chamber or recess is adapted to be seated a spring 26, as most clearly understood from Figs. 3 and 6.

27 designates a sleeve or casing having an aperture 28 therethrough thereby adapting said member 27 to be rotatably mounted on the enlarged diameter 29 of the chuck support 19. The casing member 27 has extending therefrom the flanges 30 which are apertured at 31 whereby said casing member 27 may be secured to the body of the chuck 32 by means of screws or equivalent devices 33, as will be clearly understood from Figs. 1 and 2. The inner end of the chuck 32 is chambered or recessed, as indicated at 34, and is provided with a hemispherical recess 35 forming a seat for a ball 36 which is maintained in position by means of its engagement with the end of the coil spring 26, as will be clearly understood from Fig. 3, so that the pins 23 are normally maintained in engagement with the coacting parts of the casing member 27.

37 and 38 designate cam faces on the member 27 with which the lugs or pins 23 of the support 19 coact. These cam faces 37 and 38 have their inclination in the same direction and in the same plane.

39 designates a set screw provided with a lock nut 40 and engaging the aperture 41 in the chuck 32, the end of said set screw being adapted to engage the annular groove 24 of the stationary support, so that when desired on the rotation of said casing there will be no longitudinal movement of the latter.

42 designates rods or handles secured to the chuck 32 whereby the operator is enabled to more readily rotate the chuck.

43 designates a drill fastening device whereby the drill 44 is suitably centered and held within the chuck.

In order that I may determine whether the drill is properly centered, I employ a bracket 45 having a slotted end 46 whereby said bracket may be adjustably mounted on the standard 2 by means of set screws or equivalent devices 47.

48 designates a rod rotatably mounted in the bracket 45 and adjustable therein by means of a set screw 49.

50 designates a gage rod or member which passes through the rod 48 and is longitudinally and rotatably adjusted with respect thereto by means of a set screw 51. The improper movement of the bracket 45 with respect to the standard 2 is prevented by means of a set screw 52, as most clearly seen in Fig. 2.

When it is desired to give the chuck 32 simply a rotary movement instead of a rotary and longitudinal movement, the set screw 39 is actuated so that the same engages the groove 24 and after the set screw 39 has been adjusted the cam faces 37 and 38 will be moved rearwardly to such an extent that they will not coact with the pins or lugs 23 carried by the stationary support 19.

I wish to call special attention to the novel manner of adjusting my device. The standard 2 may be vertically adjusted in the base 1 by means of the set screw 3. The casing 7 may be both rotatably and vertically adjusted on the standard 2 by means of the set screws 9 and 12. The rod 13 may be both longitudinally and rotatably adjusted with respect to the casing 7 by means of the set screws 14. The rod 17 may be rotatably adjusted by means of the set screws 53 and 18. The stem 20 may be rotatably adjusted by means of the set screws 21 and 22. It will thus be seen that in my novel construction the device may be adjusted at any desired angle with respect to the grinding machine or other sharpening mechanism.

The highest points of the cam surfaces 37 and 38 are at 54, as indicated in Fig. 5, these portions being in proximity to the extensions 30 so that when the point of the drill is in its rearmost position the pins or lugs 23 will contact with the highest portion 54 of the cam surfaces 37 and 38.

The operation of my novel construction of adjustable drill support will now be readily apparent. The desired drill is first centered in the chuck 32 and the base 1 is secured to the plate or bracket of the grinding machine by means of the screws 6. The chuck 32 is rotated to the right and owing to the employment of the spring 26 the lugs or pins 23 coact with the cam faces 37 and 38. One of the cutting edges of the drill point is in contact with the grinding wheel when the chuck 32 is in its rearmost position which is when the pins 23 coact with the high points 54 of the cam faces 37 and 38 so that as the chuck makes substantially a half rotation it will be advanced, then brought back to its normal position and then advanced as before on the completion of its rotation. In my present construction I have shown the cam faces as being on a casing detachably carried by the chuck 32 but it will be apparent that said faces may be on the chuck itself and still be within the scope of my invention.

It will be understood that owing to the employment of the spring 26 the lugs or pins 23 will always be maintained in engagement with the coacting cam faces and by the employment of an anti-friction device such as the ball 36 in combination with the spring 26 and hemispherical recess 35 in the chuck 32, the amount of friction is reduced to a minimum.

It will now be apparent from the foregoing that I have produced a novel and useful construction of portable drill grinder which embodies the features of advantage enumerated as desirable in the statement of invention and the above description and while I have in the present instance shown and described the preferred embodiment thereof which has been found in practice to give satisfactory and reliable results, it is to be understood that it is susceptible of modification in various particulars without departing from the spirit and scope of the invention or sacrificing any of its advantages.

Having thus described my invention, what I claim as new and desire to secure by Letters Patent, is:—

1. In a device of the character described, the combination with a chuck rotatably mounted, of means for automatically advancing said chuck during predetermined intervals in its rotation and means for preventing longitudinal movement of the chuck during its rotation.

2. In a device of the character described, the combination with a base, of a support adjustably carried thereby, a casing rotatably mounted on said support and having cam faces, a chuck secured to said casing, means carried by said support coacting with said cam faces to effect the longitudinal movement of said chuck during intervals in its rotation and an anti-friction device interposed between the chuck and casing.

3. In a device of the character described, the combination with a base, of a support adjustably carried thereby, a rotatable member mounted on said support and having cam faces, pins carried by said support and coacting with said cam faces to effect the longitudinal movement of said member, a chuck detachably carried by said casing and an anti-friction device interposed between the chuck, and its support.

4. In a device of the character described, the combination with a base, of a support adjustably carried thereby, a rotatable member mounted on said support and having cam faces, pins carried by said support and coacting with said cam faces to effect the longitudinal movement of said member, a chuck detachably carried by said member, an anti-friction device interposed between said chuck, and its support and means for preventing said pins coacting with said cam faces during the rotation of said chuck.

5. In a device of the character described, the combination with a base, of a support adjustably carried thereby, a rotatable member mounted on said support and having cam faces, pins carried by said support and coacting with said cam faces to effect the longitudinal movement of said member, a chuck detachably carried by said casing, yielding means for maintaining said cam faces in engagement with said pins and an anti-friction device coöperating with said yielding means.

6. In a device of the character described, the combination with a base, fastening devices carried thereby, a standard adjustably carried by said base, a casing adjustably carried by said standard, a rod adjustably carried by said casing, a member adjustably carried by said rod and extending angularly therefrom, a support adjustably carried by said member, pins carried by said support, a chuck mounted on said support, and means carried by said chuck mounted on said support and coacting with said pins to effect the longitudinal movement of said chuck during intervals in its rotation.

7. In a device of the character described, the combination with a base, of a support adjustably carried thereby, a rotatable member mounted on said support and having cam faces, pins carried by said support coacting with said cam faces to effect the longitudinal movement of said member, a chuck detachably carried by said casing and a spring held anti-friction device between the chuck and its support.

8. In a device of the character described, a base, a standard adjustably carried thereby, a support adjustably carried by said standard, pins carried by said support on opposite sides thereof, a chuck adapted to receive a drill rotatably mounted on said support, means carried by said chuck coacting with said pins to effect the longitudinal movement of said chuck on the rotation of the latter, a spring held anti-friction device between said chuck and its support and a centering device for said drill adjustably carried by said standard.

9. In a device of the character described, a base, a standard carried thereby, a support adjustably mounted on said standard and having an annular groove therein, pins carried by said support, a casing having cam faces coacting with said pins to effect the longitudinal movement of said casing, a chuck carried by said casing, a spring held anti-friction device between the chuck and its support and means carried by said chuck coacting with said groove to prevent longitudinal movement of said chuck on its rotation.

10. In a device of the character described, a base, a standard carried thereby, a support adjustably carried by said standard, pins on opposite sides of said support, a casing mounted on said support having cam faces coacting with said pins to effect longitudinal movement of said casing, a chuck carried by said casing and rotatably mounted on said support, and yielding means intermediate said support and chuck for maintaining said cam faces in engagement with said pins.

11. In a device of the character described, a base, a standard carried thereby, a stationary support adjustably carried by said standard, a casing rotatably mounted thereon, a chuck carried by said casing, means common to said support and said casing for effecting the longitudinal movement of said chuck on its rotation and adjustable means on the chuck coöperating with means on said support for preventing longitudinal movement of the chuck during its rotation.

12. In a device of the character described, a base, a standard carried thereby, a support adjustably carried by said standard and having its outer end chambered, pins carried by said support, a casing mounted on said support and having cam faces coacting with said pins to effect the longitudinal movement of said casing on its rotation, a chuck mounted on said support having a recess, a ball in said recess and a spring interposed between said ball and the bottom of said chamber.

13. In a device of the character described, a base, a fastening device carried thereby, a standard carried by said base, a sleeve adjustably mounted on said standard, a rod longitudinally and rotatably adjustable within said sleeve, a member rotatably adjustable in said rod, a support having a reduced stem rotatably mounted in said member, said support having an enlarged diameter, pins extending from the opposite sides thereof, a casing mounted on said enlarged diameter and having cam faces coacting with said pins to effect the forward and rearward movement of said casing during its rotation, a drill chuck carried by said casing, and yielding means for maintaining said cam faces in engagement with said pins.

14. In a device of the character described, a base, fastening devices carried thereby, a standard carried by said base, a sleeve adjustably mounted on said standard, a rod longitudinally and rotatably adjustable within said sleeve, a member rotatably adjustable in said rod, a support having a reduced stem rotatably mounted in said member, said support having an enlarged diameter, pins extending from the opposite sides thereof, a casing mounted on said enlarged diameter and having cam faces coacting with said pins to effect the forward and rearward movement of said casing during its rotation, a drill chuck carried by said casing, yielding means for maintaining said cam faces in engagement with said pins, and handles carried by said chuck.

15. In a device of the character described, a base, a standard carried thereby, a support carried by said standard and vertically, longitudinally, rotatably and angularly adjustable with respect thereto, a chuck rotatably mounted on said support, means common to said chuck and said support for effecting the longitudinal movement of said chuck during its rotation, said support having an annular groove therein, and a set screw carried by said chuck coacting with said groove to prevent longitudinal movement of said chuck during its rotation.

16. In a device of the character described, a base, a standard carried thereby, a support carried by said standard and vertically, longitudinally, rotatably and angularly adjustable with respect thereto, a chuck rotatably mounted on said support, means common to said chuck and said support for effecting the longitudinal movement of said chuck during its rotation, said support having an annular groove therein, a set screw carried by said chuck coacting with said groove to prevent longitudinal movement of said chuck during its rotation, and a lock nut for said set screw.

17. In a device of the character described, a base, a standard carried thereby, a support adjustably carried by said standard, pins extending from the opposite sides of said support, a casing mounted on said support and having cam faces coacting with said pins to effect the longitudinal movement of said casing on its rotation, the latter having extensions thereon, a chuck rotatably mounted on said support and detachably secured to said extensions, and yielding means for maintaining said pins in engagement with said cam faces.

OTTO LANGE.

Witnesses:
JOHN A. WIEDERSHEIM,
H. S. FAIRBANKS.